United States Patent [19]
Pfister

[11] Patent Number: 5,348,429
[45] Date of Patent: Sep. 20, 1994

[54] TAPPING APPARATUS WITH RAPID TAP ADVANCE/RETRACTION

[76] Inventor: William R. Pfister, 22 Davos Rd., Brick, N.J. 08724

[21] Appl. No.: 142,720

[22] Filed: Oct. 25, 1993

[51] Int. Cl.⁵ .................... B23B 47/18; B23G 3/00
[52] U.S. Cl. ............................ 408/129; 408/130; 408/137; 470/96
[58] Field of Search ............ 408/124, 130, 137, 138, 408/141, 129; 470/96, 198

[56] References Cited

U.S. PATENT DOCUMENTS

| | | | |
|---|---|---|---|
| 3,193,859 | 7/1965 | Pfister | 408/124 |
| 3,661,470 | 5/1972 | O'Pry | 408/137 |
| 3,690,782 | 9/1972 | Petroff | 408/137 |
| 3,788,760 | 1/1974 | Daniels | 408/137 |
| 3,838,934 | 10/1974 | Petroff | 408/137 |
| 4,692,072 | 9/1987 | Pfister et al. | 408/137 |

Primary Examiner—Daniel W. Howell
Attorney, Agent, or Firm—George J. Brandt, Jr.; Thomas R. Morrison

[57] ABSTRACT

Tapping apparatus for tapping holes in workpieces is provided with a tap assembly that includes a tap fitted to a lower tip end of a vertical lead screw, there being means including a bushing for rotating the lead screw thereby to vertically advance and retract the tap relative to the a workpiece hole. Power operating means are provided to rapidly advance and retract the lead screw independently of rotating advance/retraction of the lead screw so as to more quickly locate the tap proximal the workpiece hole allowing that tapping commences with lessened need for lead screw rotation as a means of effecting lineal advance of the lead screw. This lessens the tapping cycle time and results in increased production rate with the apparatus as well as lengthening tap life. The power operating means also functions to rapidly retract the lead screw and tap upwardly from the workpiece on completion of the tapping which also increases production particularly where the workpiece includes heightened structure adjacent the hole location so that more rapid tool clearance is achieved permitting quicker workpiece indexing to present a next to be tapped hole at a tapping station.

8 Claims, 4 Drawing Sheets

5,348,429

TAPPING APPARATUS WITH RAPID TAP ADVANCE/RETRACTION

BACKGROUND OF THE INVENTION

The present invention relates to tapping apparatus and, more particularly, to tapping apparatus which includes a tap assembly that can be more rapidly advanced to and retracted from a tapping station thereby increasing apparatus production capacity.

A significant problem encountered in tapping workpieces in punch press apparatus is that presented by workpiece heightened structure presenting obstruction to tool clearance for indexing the workpiece to present a next hole for tapping.

This is also true in the case where material lift is involved. Material lift is the distance a workpiece strip must move vertically in the indexing thereof to present a new strip part at a tapping station.

The distance varies from part to part, due to different bends or draws required to produce a part. In the past when a workpiece required a high material lift in production, different expedients had to be employed in order to tap a hole in the workpiece. These included using stripper mounted and bottom up tapping practices. Even with these adaptations, some parts still could not be tapped in a punch press apparatus.

Accordingly, it is desirable that a rapid advance lead screw assembly be provided for tapping apparatus which will make high lift parts simpler to tap as well as to allow parts heretofore thought untappable in a punch press to be tapped.

OBJECTS AND SUMMARY OF THE INVENTION

Accordingly, it is an object of the invention to provide a rapid advance tap assembly for tapping apparatus which overcomes the drawbacks of the prior art.

It is a further object of the invention to provide a rapid advance tap assembly which increases the life of the tap assembly components including the tap, the lead screw etc by slowing down tap RPM.

It is a still further object of the invention to provide a rapid advance tap assembly the use of which provides increased production rates.

Another object is to provide a tap assembly which enables tapping of complex parts with high or low lift requirements.

Yet another object is to provide production cost savings.

Another object is to provide a tap assembly readily adaptable for use with existing tapping apparatus, and with a variety of tap pitches and sizes.

Briefly stated, there is provided tapping apparatus for tapping holes in workpieces which is provided with a tap assembly that includes a tap fitted to a lower tip end of a vertical lead screw, there being means including a bushing for rotating the lead screw thereby to vertically advance and retract the tap relative to the a workpiece hole. Power operating means are provided to rapidly advance and retract the lead screw independently of the rotating advance/retraction of the lead screw so as more quickly to locate the tap proximal the workpiece hole allowing that tapping commences with lessened need for lead screw rotation as a means of effecting lineal advance of the lead screw. This reduces tapping cycle time and permits increased production rate with the apparatus. The power operating means also functions to rapidly retract the lead screw and tap upwardly from the workpiece on completion of the tapping which also increases production particularly where the workpiece includes heightened structure adjacent the hole location so that more rapid tool clearance is achieved enabling quicker workpiece indexing to present a next to be tapped hole at a tapping station.

In accordance with these and other objects of the invention, there is provided tapping apparatus for cutting threads in workpiece holes which comprises a top plate and a bottom plate, the top plate being vertically movable downwardly toward and upwardly away from the bottom plate. A tap assembly is supported on the bottom plate at a tapping station location thereon and is spaced a distance above the bottom plate so that a workpiece to be tapped can be positioned below the tap assembly at the tapping station. The tap assembly includes a threading tap carried at a lower tip end of a vertical lead screw, the tap assembly also including a rotatably driveable means operably connected to the lead screw for rotating the lead screw, the lead screw being received in a companionly threaded bushing so that rotation of the lead screw results in vertical movement of the lead screw towards and away from a workpiece positioned at the tapping station in correspondence to a rotation direction of the lead screw. The top and bottom plate mount drive means operable when the top plate is moved downwardly and upwardly in a straight line movement thereof for producing rotary drive in a drive means gear train, an output from said gear train being coupled with the tap assembly rotatably driveable means. The tap assembly embodies power operating means for effecting rapid downward advance-upward retraction vertical movement of the threaded bushing and correspondingly the lead screw independently of lead screw vertical movement incident lead screw rotation. This is so as to position the threading tap proximal a workpiece hole to be tapped prior to lead screw rotation in one direction effects tapping entry of the tap into the workpiece hole and to move the threading tap to a point distal the workpiece hole upon a counter directional lead screw rotation withdrawal of the tap from the tapped hole.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
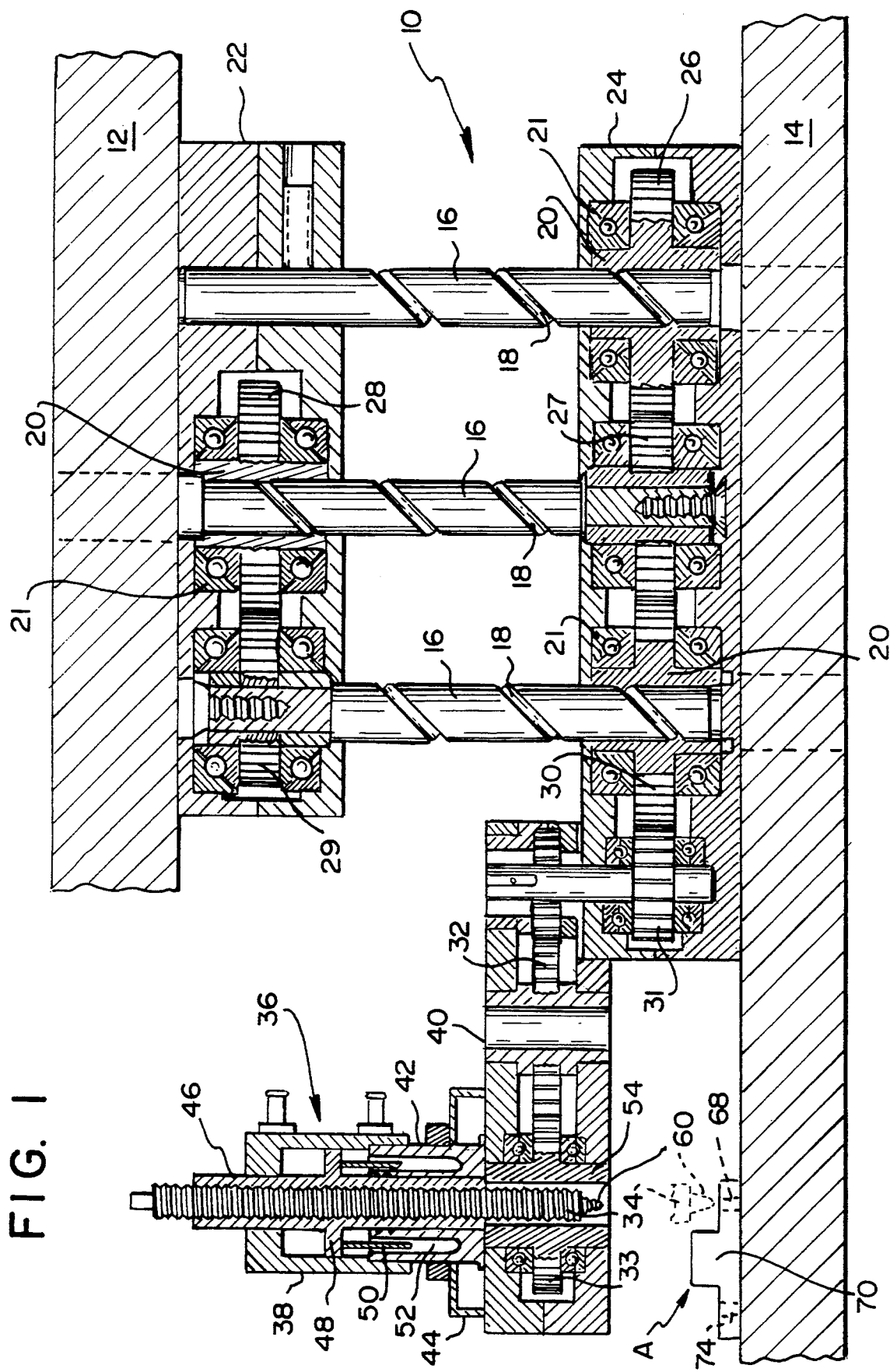
FIG. 1 is a front elevational view in section of tapping apparatus constructed in accordance with the principles of the invention.

Referring to FIG. 1, the tapping apparatus 10 depicted therein is, except for the tap assembly to be described below, of the type, construction and general operation as described in my earlier granted U.S. Pat. Nos. 3,193,859 and 4,692,072.

Apparatus 10 comprises a top plate 12 and a bottom plate 14, the top plate being movable vertically toward and away from the bottom plate, this movement being possible because the top plate is connected with the bottom plate by means of a number of cam shafts 16. The cam shafts 16 each have helical grooves 18 therein, and in these grooves ride helical splines carried at inner surfaces of bushings 20 surrounding the cam shafts, the bushings being supported in bearings 21 which in turn are housed in block units 22, 24 secured respectively to the top and bottom plates.

The effect of this is that when the top plate is moved vertically in straight line movement toward and away from the bottom plate, the cam shafts 16 will be caused to rotate in one or the other of two opposite directions depending on the travel direction of the top plate, this conversion of straight line motion to rotary motion being for the purpose as will be described next.

The block units 22, 24 and a transfer block unit 40 embody a gear train comprised of gears 26–33, the gear 33 being an end point or train output gear. Gear 33 is used to rotate a lead screw 34 in tap assembly 36 disposed a distance above the bottom plate 14 and located over a tapping station area A.

Tap assembly 36 comprises a housing unit including an upper housing part 38, a lower housing part 42 and a base piece 44. Vertically disposed lead screw 34 is externally threaded and is received in a companion internally threaded bushing 46. This arrangement allows that rotation of the lead screw in bushing 46 results in vertical advance or retraction of the lead screw relative to bottom plate 14 depending on the direction of lead screw rotation.

Lead screw rotation is accomplished by gear 33 which is fixed to a bushing 54 in transfer block 40.

Bushing 54 carries splines 56 (FIG. 2) which extend into reciprocally located slots 58 on the lead screw. Rotation of gear 33 thus rotates the lead screw via this spline drive.

Bushing 46 has a laterally extending encircling flange 48 which can slide inside the housing along an inner encircling surface therein. An underside of the flange carries a circle of spaced guide pins 50 which are receivable in a circle of blind bores 52 formed in the lower housing part 42.

The lower tip end of the lead screw 46 carries threading tap 60, the manner of the tap mounting to the lead screw being with a chuck as described in my above mentioned two patents. Further, it is to be noted that adjustment of tap height, when necessary, is effected in the same manner as with the TH Series tapping units sold by Automated Tapping Systems, Inc. of Bricktown, NJ.

Figure 2:
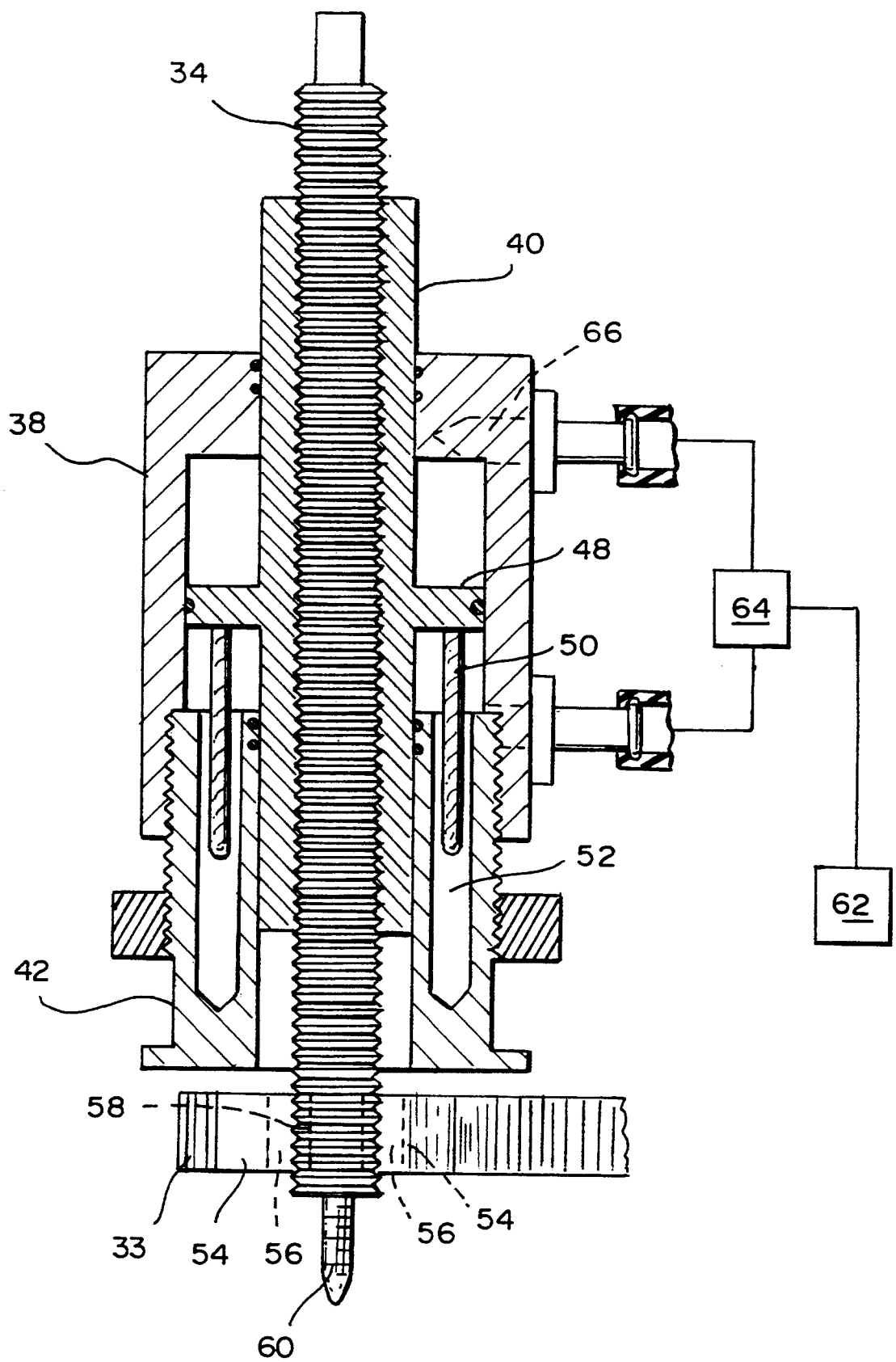
FIG. 2 is a vertical central sectional view on enlarged scale of the tap assembly depicted in FIG. 1 which embodies lead screw advance/retraction power operating means in the form of fluid pressure operated devices.

Power operating means are provided to rapidly vertically advance or retract the lead screw relative to the bottom plate 14 and independently of any vertical movement imparted to the lead screw through the rotation thereof in bushing 46. In FIGS. 1 and 2 this power operating means utilizes fluid pressure such as compressed air to effect the lead screw vertical movement and as will be detailed next.

Referring to FIGS. 1 and 2, compressed air from a source 62 feeds through a control valve unit 64 and if admitted through passage 66 in the housing at an upper face side of flange 48, will stroke the bushing 46 and hence the lead screw rapidly downwardly, the bushing travelling to a lower extreme positioning thereof in the housing.

This rapid downward movement of the lead screw will result in the tap 60 being positioned proximal a hole 68 in the workpiece 70 which is to be threaded with the tap. Because of this rapid positioning of the tap proximal the hole, only a limited number of lead screw rotations to produce the aditional advance travel to cause the tap to enter the hole and initiate threading thereof will be needed.

On completion of the tapping operation, top plate 12 which had moved downwardly close to the bottom plate will by means known in the art be caused to move upwardly. This will produce a reverse rotation mode in the gear train and of the lead screw so that the tap 60 will retract upwardly with the tap assembly, plate 12 and the lead screw 34, the latter vertically retracting because of rotation effect in bushing 46. But as soon as the tap has cleared now tapped hole 68, air pressure at the upper face side of the flange 48 will be released and concurrently, compressed air will be admitted through housing passage 72 to the lower face side of the flange 48 and this will cause now rapid upward retractive movement of the lead screw away from tapping station A clearing the station so that lifting movement of the workpiece can ensue and the workpiece be moved to position the next to be tapped hole 74 at the tapping station. The cycle of top plate 12 downward movement etc then will begin anew.

The other embodiments of power operating means shown in FIGS. 3 and 4 will be described now, it being noted that like parts in these Figures to those shown in FIGS. 1 and 2 have the same reference numerals.

Figure 3:
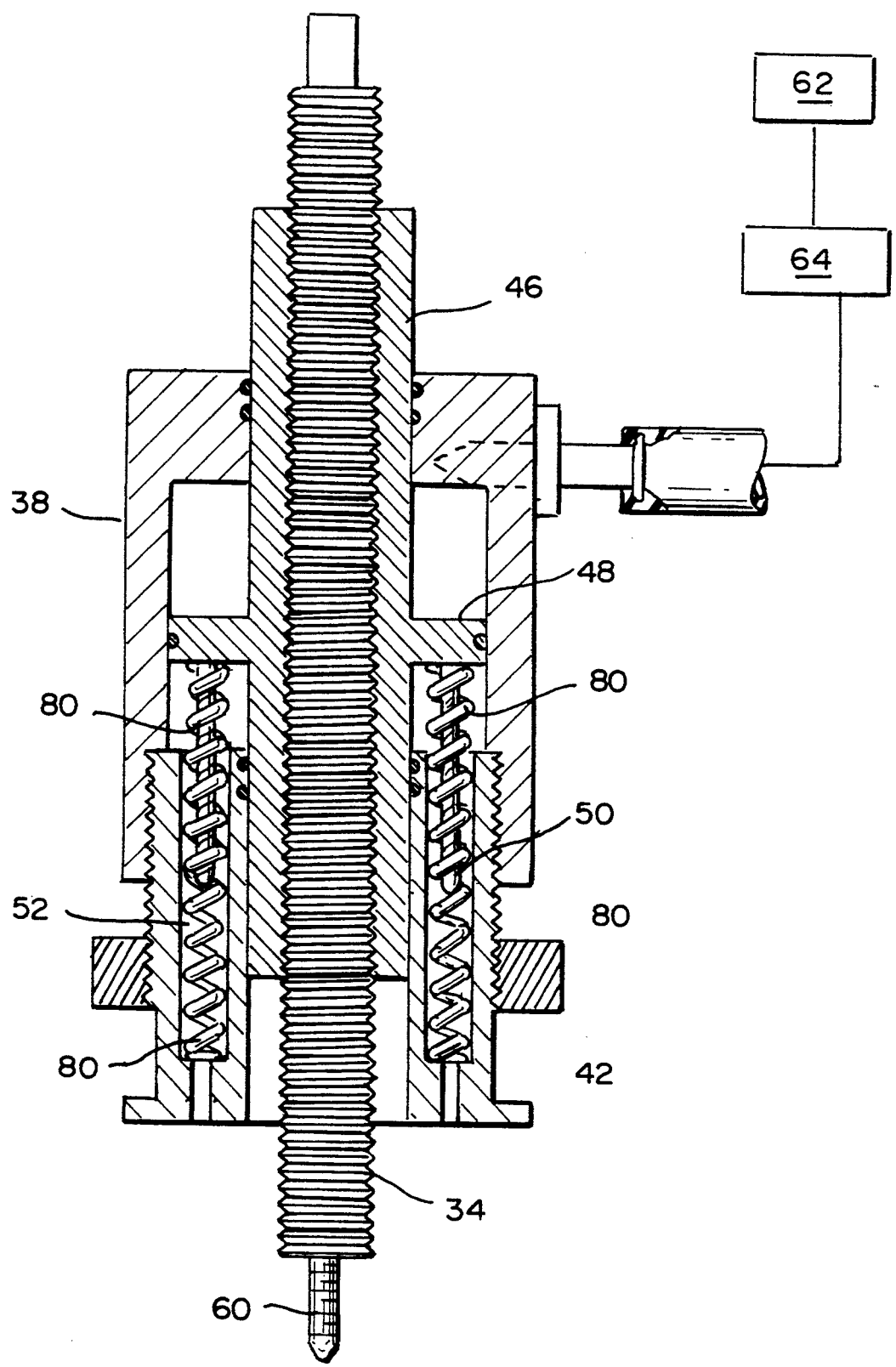
FIG. 3 is a vertical central sectional view of an embodiment of tap assembly similar to FIG. 2 but in which fluid pressure is used for power advancing the lead screw but in which compression springs are employed to effect retraction.

Referring to FIG. 3, the power operating means for rapid advance/retraction of the lead screw like that of the FIGS. 1 and 2 embodiment uses compressed fluid to rapidly advance the lead screw downwardly. Rapid retraction in the upper direction is on the other hand effected with energy storing means such as compression springs 80 which encircle the pins 50 and are situated in the blind bores 52 with upper ends of these springs 80 being engaged with the lower face of flange 48.

On release of, e.g., air pressure from the upper side face of the flange 48, the stored energy of the springs produced therein by same being compressed during flange downward movement, becomes transferred as an upward directed force acting on the bushing so the bushing is stroked to its upper extreme position in the housing.

Figure 4:
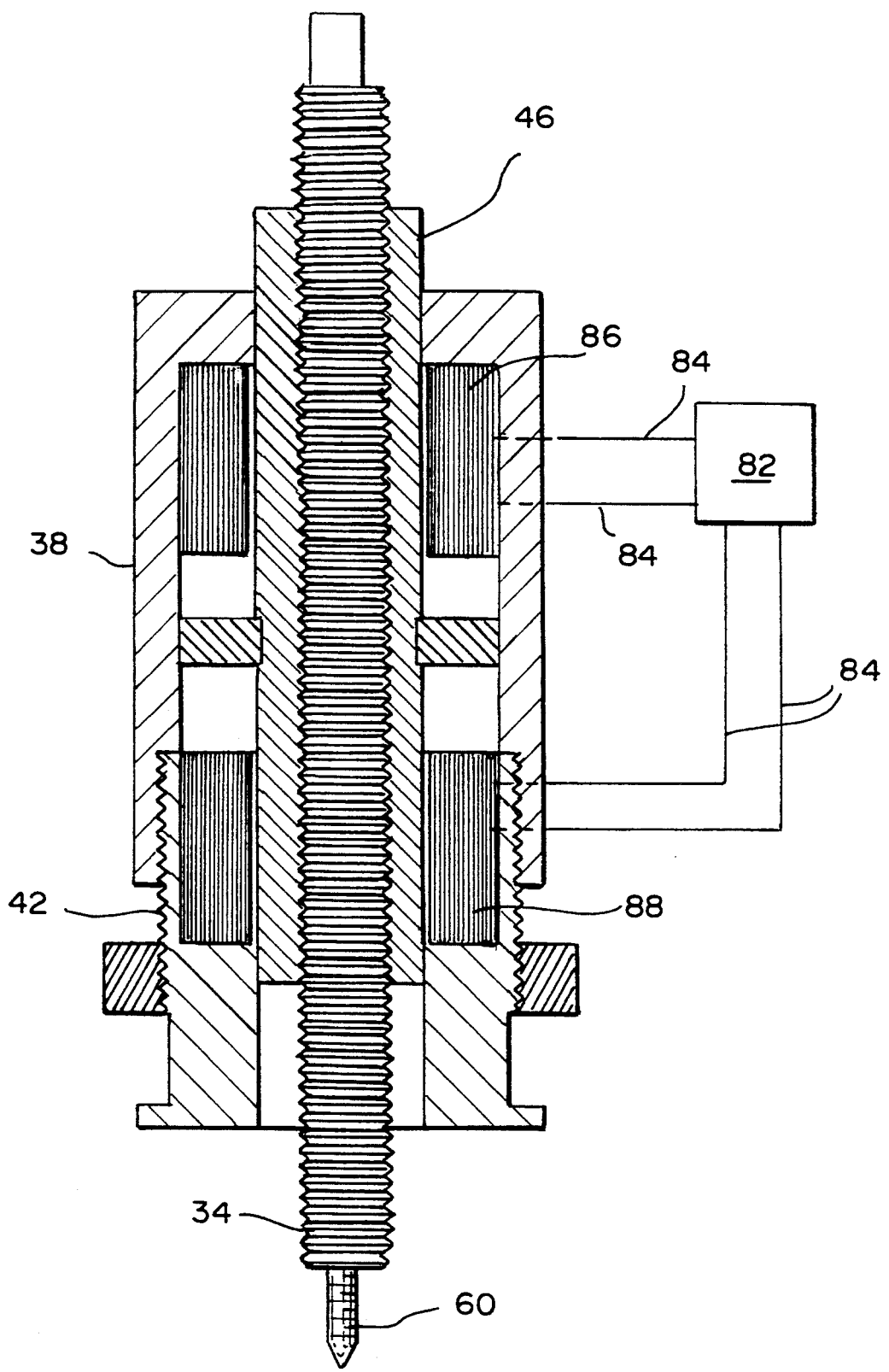
FIG. 4 is a view of an embodiment like those of FIGS. 2 and 3 except that electrical solenoids are used to advance/retract the lead screw.

FIG. 4 depicts utilization of solenoids as power operating means. In that embodiment, upper and lower solenoid coil windings 86, 88 encircle the lead screw and bushing 46 which serves as the solenoid armature. A control unit 82 connected as at 84 to the coils 86, 88 is used to energize the coil and cause armature pull up or down depending on whether the tapping cycle is in the lead screw advance or retraction modes and this in turn producing the rapid vertical travel of the lead screw intended.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Tapping apparatus for cutting threads in workpiece holes comprising, a top plate and a bottom plate, the top plate being vertically movable downwardly toward and upwardly away from the bottom plate, a tap assembly supported on the bottom plate at a tapping station location thereon and spaced a distance above said bottom plate so that a workpiece to be tapped can be positioned below the tap assembly at the tapping station, the tap assembly including a threading tap carried at a lower tip end of a vertical lead screw, the tap assembly including a rotatably driveable means operably connected to the lead screw for rotating the lead screw, the lead screw being received in a companionly threaded bushing so that rotation of the lead screw results in vertical movement of the lead screw towards and away from a workpiece positioned at the tapping station in correspondence to a rotation direction of the lead screw, the top and bottom plate mounting drive means operable when said top plate is moved downwardly and upwardly in a straight line movement thereof for producing rotary drive in a drive means gear train, an output from said gear train being coupled with said tap assembly rotatably driveable means, and, the tap assembly embodying power operating means for effecting rapid downward advance-upward retraction vertical movement of the threaded bushing and correspondingly the lead screw independently of lead screw vertical movement incident lead screw rotation so as to position the threading tap proximal a workpiece hole to be tapped prior to lead screw rotation in one direction effects tapping entry of the tap into said workpiece hole and to move the threading tap to a point distal the workpiece hole upon a counter directional lead screw rotation withdrawal of the tap from the tapped hole.

2. The tapping apparatus of claim 1 in which the tap assembly includes a housing, the threaded bushing being slidably received in said housing and being movable therein between upper and lower extreme bushing positionings.

3. The tapping apparatus of claim 2 in which the threaded bushing includes an encircling laterally extending flange, the flange being movable along an interior encircling surface of the housing.

4. The tapping apparatus of claim 3 in which the rapid advance/retraction power operating means comprises means in the housing for admitting a pressurized fluid flow from a source thereof to an upper face side of said bushing encircling flange for stroking said bushing to a lower extreme position thereof, the power operated means operating to stroke the bushing to an upper extreme position thereof on release of pressurized fluid from said encircling flange upper face side.

5. The tapping apparatus of claim 4 in which the power operating means comprises means in the housing for admitting pressurized fluid from said source to a lower face side of said bushing encircling flange so that pressurized fluid at said lower side face will in absence of pressurized fluid at said upper side face stroke the bushing to its upper extreme position.

6. The tapping apparatus of claim 5 in which the pressurized fluid is pressurized air.

7. The tapping apparatus of claim 4 in which the power operating means comprises resilient energy storing elements carried in the housing and engageable with a lower face side of said bushing encircling flange, stroking of said bushing to a lower extreme position transferring energy to said elements, said elements upon release of pressurized fluid at the upper face releasing the energy therein as an upward exerted pressure on said bushing encircling flange which strokes the bushing toward its upper extreme position.

8. The tapping apparatus of claim 3 in which the rapid advance/retraction power operating means comprises upper and lower electrical solenoids carried in the housing, energization of one of said upper and lower solenoids stroking said bushing to a lower extreme position thereof, energization of the other of said upper and lower solenoids stroking said bushing to an upper extreme position thereof.

* * * * *